Aug. 25, 1964    H. C. FRENTZEL    3,145,583
DIFFERENTIAL
Filed Aug. 22, 1962    2 Sheets-Sheet 1

INVENTOR.
Herman C. Frentzel
BY *John W. Michael*
Attorney

Aug. 25, 1964   H. C. FRENTZEL   3,145,583
DIFFERENTIAL
Filed Aug. 22, 1962   2 Sheets-Sheet 2
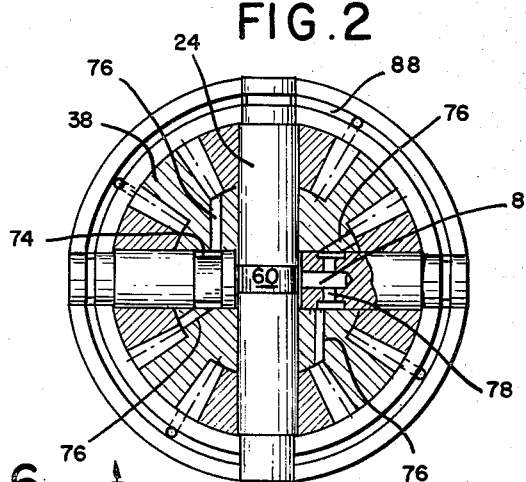
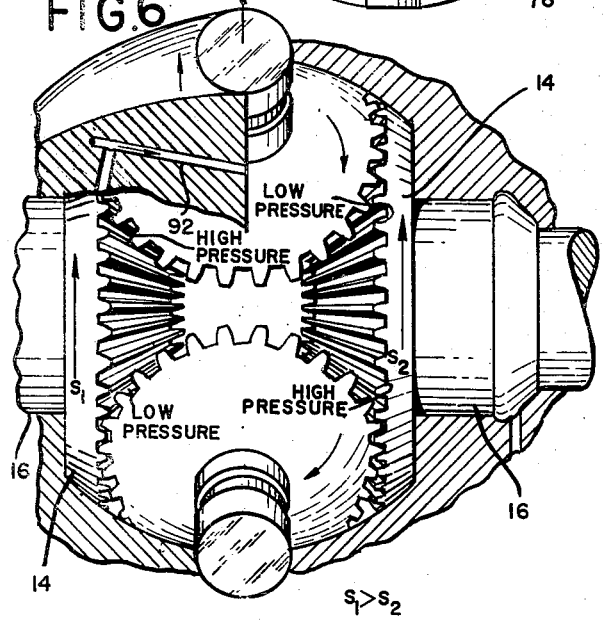
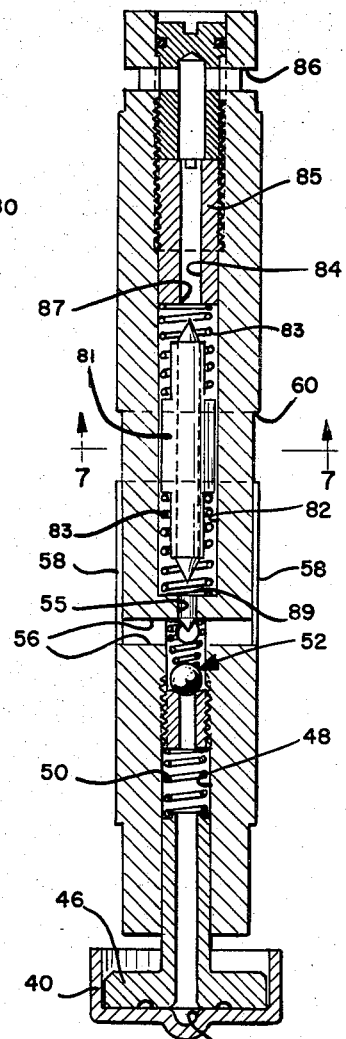
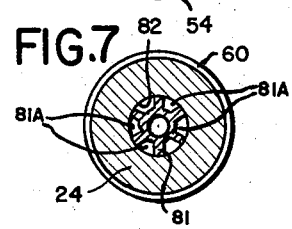
INVENTOR.
Herman C. Frentzel
BY John W. Michael
Attorney United States Patent Office 3,145,583
Patented Aug. 25, 1964

3,145,583
DIFFERENTIAL
Herman C. Frentzel, % Frentzel Engineering Company,
125 W. Melvina St., Milwaukee 12, Wis.
Filed Aug. 22, 1962, Ser. No. 218,707
13 Claims. (Cl. 74—711)

This invention relates to differential gears for automotive devices and more particularly to limited differential action type gears.

Differential gears of the type contemplated herein are shown in my copending application Ser. No. 833,546, filed August 13, 1959, now Patent No. 3,049,943, issued August 21, 1962. In this type of differential each low pressure area between the gears is connected directly to a high pressure area by means of independent throttling orifices. Where a smaller differential and a greater torque is required, a second (or more) set of pinion gears can be introduced into the gearing to distribute the hydraulic load over more tooth area and reduce the hydraulic pressure for the same output torque. The addition of these pinion gears makes it impractical to provide a direct connection between a high pressure area and a low pressure area. Also, with the reduction in size in the differential, the pumping system was also found to be inadequate to meet the needs of the gear.

The primary object of this invention is to provide an improved limited action type differential that is reduced in size with an increased torque output.

Another object of this invention is to provide a single control valve to control the flow of fluid from the low pressure areas to the high pressure areas in a differential gear.

A further object of this invention is to provide a positive means for maintaining fluid within the confines of the differential gear.

These objects are accomplished by inserting a spider member within the space between the drive and pinion gears of a standard differential so that each drive and pinion gear is housed within a separate cavity. High and low pressure areas will then be set up between the areas of engagement and disengagement. Passages are provided in the spider member and differential housing to connect the areas of like pressure with the areas of opposite pressure through a central control valve. Differential action can then be positively stopped whenever the torque on one drive shaft exceeds the torque on the other drive shaft by a predetermined amount.

The fluid pressure within the differential housing is maintained at a predetermined pressure by a novel plunger type pump located in the pinion spindle. The plunger is reciprocated by the camming action of a fluid reservoir mounted on the outside of the differential housing. In each revolution of the differential housing the plunger is reciprocated once, drawing fluid into the plunger during half of a revolution and pumping fluid out of the differential during the other half of the revolution.

Other objects and advantages will be pointed out in, or be apparent from, the specification and claims, as will obvious modifications of the single embodiment shown in the drawings, in which:

FIG. 2 is a view taken on line 2—2 of FIG. 1 showing the interior passage arrangement;

FIG. 4 is a view in section of the control valve and pump in the pinion gear spindle;

FIG. 6 is a view of the gear arrangement; and

FIG. 7 is a view taken on line 7—7 of FIG. 4 showing the valve member in the pinion spindle.

Figure 1:
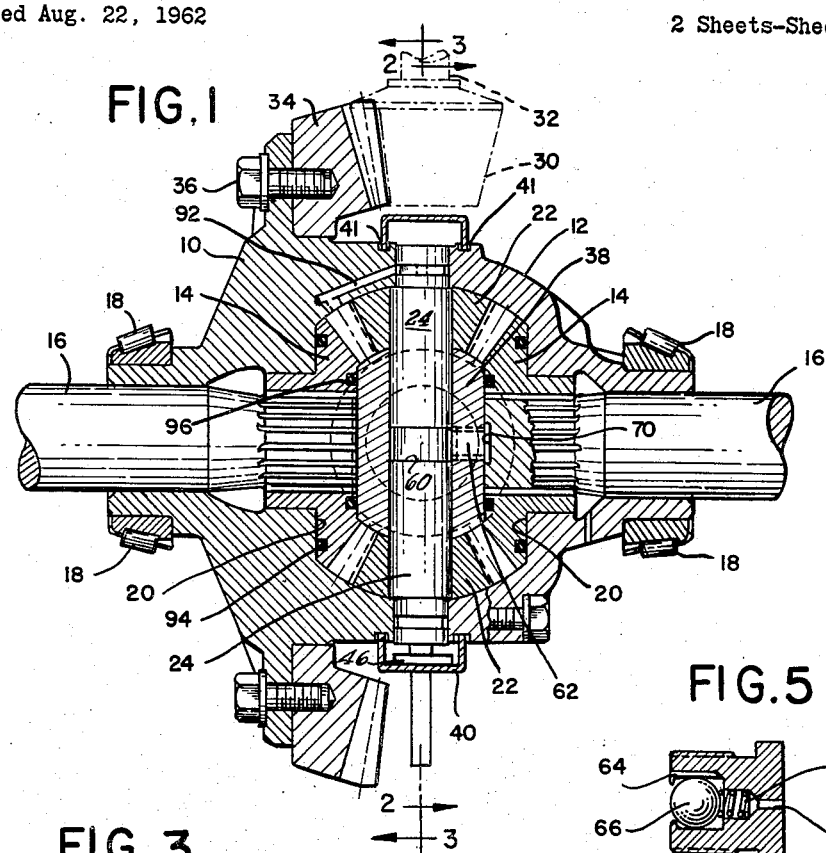
FIG. 1 is a plan view of the present invention partly in section.

Referring to the drawings, a standard split differential housing 10, 12 is shown having a pair of driven gears 14 coaxially mounted on the splined ends of axles 16. The driven gears are positioned within cavities in the housing and ride on thrust bearing surfaces 20. The driven gears mesh with one pair of pinion gears 22 mounted on pinion spindle 24 and a second pair of pinion gears 26 mounted on stub shafts 28. The pinion spindle and stub shafts are secured to the housing with their axes transverse to the axis of the driven gears so that upon rotation of the housing on the driven gear axis the pinion gears will transmit an equal driving force to each driven gear. The differential housing is driven by drive gear 30 mounted on the end of drive shaft 32 which engages a ring gear 34 secured to the housing by screws 36. Roller bearings 18 are provided on the housing to support the housing for rotation within an oil reservoir (not shown).

The driven gears and pinion gears are separated into independent chambers by a single inner block 38 which substantially fills the space between the six gears and separates the areas of engagement from the areas of disengagement between the teeth of the gears. For proper operation of the differential, it is essential to keep the interior of the differential filled with oil. In order to achieve this a U-shaped annular reservoir 40 is mounted to ride in slots 41 on the exterior of the housing and has an opening 42 at its lower end which communicates with the oil reservoir. The reservoir is prevented from rotating by a stationary plate 44 that holds the reservoir opening in the down position.

Figure 3:
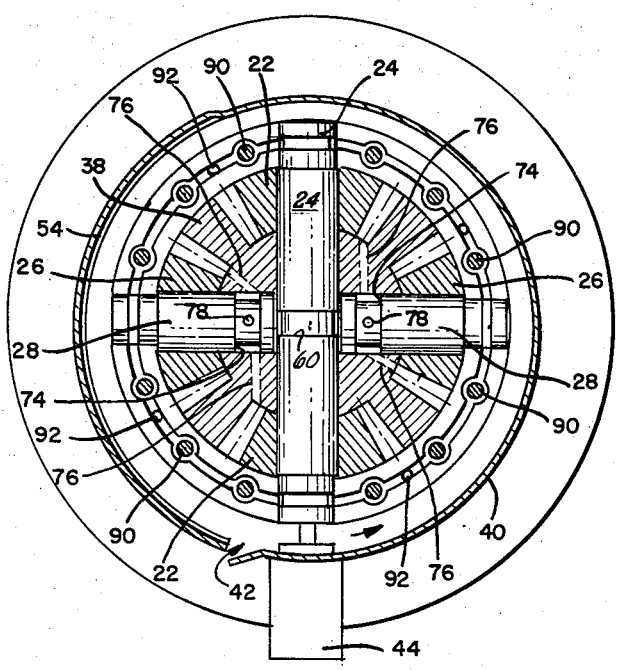
FIG. 3 is a view taken on line 3—3 showing the exterior passage arrangement and the pump arrangement.

Oil is pumped from the reservoir to the interior of the differential by means of a plunger 46 which is mounted for reciprocal motion within an axial passage 48 in the pinion spindle 24. The plunger is biased against the inner surface of the reservoir by spring 50 and is reciprocated by the camming action of the reservoir as seen in FIG. 3 as the differential is rotated. The reservoir is shown eccentrically mounted on the differential housing with the lower side of the reservoir spaced at a greater distance from the end of the spindle than the upper side. As the differential is rotated in a counterclockwise direction through half a revolution, the plunger is pushed gradually into the pinion spindle by the decreasing distance between the reservoir and the end of the spindle. The surface of the reservoir is cylindrical so that it forms a seal with the cylindrical surface of the plunger, forcing any oil within the plunger past ball type check valve 52 during the first half of a revolution. When the differential is rotated through the other half of a revolution the plunger will be pushed out of the spindle as it slides along the surface of the reservoir. A groove 54 is provided in the center of the flat surface of the reservoir to allow oil to be drawn into the plunger as it comes out of the spindle. This cycle is repeated each time the differential makes a complete revolution.

Figure 5:
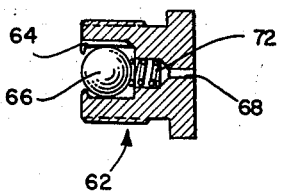
FIG. 5 is a view in section of the relief valve arrangement.

The oil that is forced past the check valve flows through passages 56 and grooves 58 to a central annular groove 60 for distribution to the low pressure areas within the housing. In the event that the differential is filled with oil and the pump continues to force oil into the housing, a bleed-off is provided for through check valve 62 which is shown in FIG. 5. The oil flows through grooves 64 around ball 66 in the check valve and out through port 68. A slight recess 70 is provided in the end of the axle adjacent the check valve which allows the oil to leak back to the differential reservoir through the splined end of the axle. If differential action should occur between the pinion and driven gears, the increased pressure of the oil within the differential will cause the ball 66 to compress spring 72, closing the port in the check valve.

Oil flows from the areas of high pressure to the areas of low pressure through passages provided in the differential housing and inner block. In a four pinion differential gear there will be eight areas of high pressure and eight areas of low pressure since meshing of a pinion and driven gear creates the equivalent of a gear pump. Considering each such "gear pump" it will be clear that the inlet (low pressure) and outlet (high pressure) are determined by the direction of relative rotation between the pinion and driven gear, with the inlet being where the gears come out of mesh and the outlet being where they go into mesh. Referring to FIGS. 2 and 3, the areas of like pressure in housing 10 are connected to an annular groove 74 on the stub shaft by passages 76. Assuming these to be high pressure areas, the oil will flow through aperture 78 into an axial passage 80 in the stub shaft and into annular groove 60 on the spindle. The oil then flows through grooves 58, passages 56, and central passage 55 into the control valve chamber 82 in the spindle. From the control valve chamber the oil flows through passage 84 in adjusting nut 85 into an annular groove 86 near the end of the spindle. The oil then flows into groove 88 between the two halves of the housing around mounting bolts 90 and into passages 92 which lead to the low pressure areas between the gears. If differential action is reversed the flow of oil will be reversed through the same flow path. If there is no differential action there is no flow.

Differential action is controlled by a valve pin 81 positioned within the control chamber in the spindle. The valve pin is maintained in a balanced position by springs 83. Since a certain amount of differential action may be required under certain circumstances such as turning corners, the oil is allowed to pass through grooves 81A (FIG. 7) in the sides of the valve pin. As the pressure builds up on either side of the valve pin, depending on the direction of oil flow, the valve pin will be forced in the direction of oil flow until it seats in either valve seat 87 or 89. This stops oil flow through the passages and hydraulically locks the gears from any further differential action so that you have positive drive on both axles.

To seal the oil in the system, O-rings 94 and 96 are used to prevent oil from leaking out of the housing. It can be seen that the rotation of the gears is such that the oil is normally pumped by slow forward differential action from the pressure areas to the center of the differential to the circumferential groove so that by centrifugal action the gear area is always solidly filled with oil at all times. Any entrapped air, due to centrifugal action and the flow direction which directs it to the outlet port during forward travel of the vehicle, is forced out through port 68 which is at the point where there is little or no centrifugal action.

Although only one embodiment of the present invention has been illustrated and described, it will be apparent to those skilled in the art that various changes and modifications may be made therefrom without departing from the spirit of the invention or from the scope of the appended claims.

I claim:

1. A differential comprising,
    a housing mounted for rotary motion and adapted to contain oil,
    a pair of axles extending into said housing,
    driven gears positioned within the housing and secured to the axles,
    a tubular spindle carried by the housing,
    pinion gears rotatably mounted on the spindle and meshing with the driven gears,
    a single block positioned on the spindle within the confines of the pinion gears and driven gears and defining areas of engagement and disengagement between the teeth of the pinion and driven gears whereby the meshing of each driven gear with a pinion serves as a gear pump drawing oil into the area of disengagement and delivering oil at the area of engagement,
    passage means in the housing and block connecting areas of engagement and areas of disengagement with the spindle,
    control means within the spindle for regulating flow of oil from the areas of engagement to the areas of disengagement, and pump means within the spindle for maintaining oil within the housing.

2. A differential according to claim 1 wherein said control means comprises,
    a valve chamber within said spindle having a valve seat at each end of the chamber,
    a valve member positioned within said chamber for movement between said valve seats,
    spring means holding said valve member in an intermediate position between said valve seats,
    said valve member moving into engagement with one of the valve seats in response to a predetermined flow rate between the areas of engagement and the areas of disengagement to stop the flow of oil through the spindle thus preventing further differential action between the gears.

3. A differential according to claim 2 wherein said valve member has a number of grooves along each side which allows a predetermined amount of oil to flow past the valve member thus allowing for limited differential action between the gears.

4. A differential according to claim 3 wherein one of said valve seats is adjustable axially with respect to the other valve seat to vary the flow rate necessary to move the valve member.

5. A differential according to claim 1 including a stationary reservoir mounted to slide on the housing and having a cam surface for moving said pump means through a pump stroke and a fill stroke in each revolution of the housing to pump oil from the reservoir into the housing.

6. A differential according to claim 5 wherein said pump means comprises a tubular plunger mounted for reciprocal motion within said spindle and a check valve to control the flow of oil pumped into the housing, said plunger being biased to ride on the cam surface of said reservoir.

7. A differential according to claim 6 wherein said cam surface is flat to form a seal with the face of said plunger during the pump stroke and has a groove therein to allow for the admission of oil into the plunger during the fill stroke.

8. A differential comprising,
    a housing mounted for rotary motion through an oil reservoir and having a central gear chamber,
    a filler block positioned within said chamber to form separate gear cavities in said chamber,
    a pair of axles extending into said housing,
    driven gears positioned within two of said cavities and secured to the ends of said axles,
    a spindle extending through said block and terminating in said housing,
    said spindle having an axial passage therein,
    pinion gears mounted on said spindle within said cavities in a position to mesh with the driven gears,
    a pair of stub shafts extending from said block into said differential housing,
    said stub shafts having axial passages therein,
    a pinion gear mounted on each stub shaft within cavities in said block in a position to mesh with the driven gears,
    said pinion gears and driven gears serving as gear pumps forming first and second areas of like liquid pressure between the points of engagement and the points of disengagement between the gears,
    first passage means in the housing connecting the first areas of like liquid pressure with the axial passage in the spindle, second passage means in the block connecting the second areas of like liquid pressure with the passages in the stub shafts,
necting the axial passage in the stub shaft with the axial passage of the spindle thereby defining a liquid flow path from the areas of engagement to the areas of disengagement between the gears,
and control means in the axial passage in the spindle controlling the flow of oil through the spindle to hydraulically lock the gears from differential action at a predetermined flow rate.

9. A differential according to claim 8 wherein said control means comprises,
a chamber within the spindle having a valve seat at each end,
a valve member positioned within said chamber for movement between said valve seats,
spring means holding said valve member in an intermediate position between said valve seats,
said valve member being movable into engagement with one of the valve seats at the predetermined flow rate between the areas of engagement and the areas of disengagement to stop the flow of oil through the spindle.

10. A differential according to claim 8 including means for maintaining the cavities within the housing full of oil.

11. A differential according to claim 10 wherein said means for maintaining the cavities full of oil includes a pump means mounted for reciprocal motion within said spindle and a stationary reservoir mounted to slide on the housing and having a cam surface for moving said plunger type pump through a pump stroke and a fill stroke in each revolution of the housing to pump oil from the reservoir into the housing.

12. A differential according to claim 11 wherein said pump means comprises, a tubular plunger and a check valve to control the flow of oil pumped into the spindle, said plunger being biased to ride on the cam surface of said reservoir.

13. A differential according to claim 12 wherein said cam surface is flat to form a seal with the face of said plunger during the pump stroke and has a groove therein to allow for the admission of oil into the plunger during the fill stroke.

References Cited in the file of this patent

UNITED STATES PATENTS

| | | |
|---|---|---|
| 2,650,507 | Clintsman | Sept. 1, 1953 |
| 2,722,134 | Cabell | Nov. 1, 1955 |
| 2,722,140 | Cabell | Nov. 1, 1955 |
| 2,789,447 | Cabell | Apr. 23, 1957 |

UNITED STATES PATENT OFFICE
CERTIFICATE OF CORRECTION

Patent No. 3,145,583                      August 25, 1964

Herman C. Frentzel

It is hereby certified that error appears in the above numbered patent requiring correction and that the said Letters Patent should read as corrected below.

Column 5, lines 3 and 4, strike out "passage means in the central part of the spindle con- in the stub shafts," and insert instead -- in the stub shafts, passage means in the central part of the spindle con- --.

Signed and sealed this 8th day of December 1964.

(SEAL)
Attest:

ERNEST W. SWIDER                      EDWARD J. BRENNER
Attesting Officer                        Commissioner of Patents